United States Patent [19]

Yamakita et al.

[11] Patent Number: 4,647,348

[45] Date of Patent: Mar. 3, 1987

[54] METHOD FOR PRODUCTION OF FILM-COATED SILICON SEMICONDUCTOR ELECTRODE

[75] Inventors: Hiromi Yamakita, Asahi; Kiyoshi Hayakawa, Gifu; Masato Tazawa; Hiroshi Taoda, both of Nagoya, all of Japan

[73] Assignees: Agency of Industrial Science & Technology; Ministry of International Trade and Industry, both of Tokyo, Japan

[21] Appl. No.: 838,822

[22] Filed: Mar. 12, 1986

[30] Foreign Application Priority Data

Mar. 14, 1985 [JP] Japan .................................. 60-51514
May 9, 1985 [JP] Japan .................................. 60-98265

[51] Int. Cl.$^4$ .............................................. C25B 3/00
[52] U.S. Cl. .................................. 204/59 R; 204/72; 204/157.7; 252/500; 252/518; 427/53.1
[58] Field of Search .................... 204/59 R, 72, 157.7; 252/500, 518; 427/53.1

[56] References Cited

U.S. PATENT DOCUMENTS

| | | | |
|---|---|---|---|
| 4,501,686 | 2/1985 | Hotta | 252/518 |
| 4,548,696 | 10/1985 | Weaver | 204/59 R |
| 4,559,112 | 12/1985 | Tamamura et al. | 204/59 R |
| 4,582,587 | 4/1986 | Hotta et al. | 252/500 |

OTHER PUBLICATIONS

Chem. Abstracts, vol. 102 (1985) #92246 (Abstract of Jpn Kokai 59,207,932.
*J. Electrochem. Soc.*-Electrochemical Sciences and Technology, vol. 128, No. 12, R. Noufi et al., "Protection of Semiconductor Photoanondes with Photoelectrochemically Generated Polypyrrole Films", pp. 2596-2599, Dec. 1981.
*Berichte der Bunsen–Gesellschaft*, vol. 80, No. 10, 1976, Y. Nakato et al. "A New Photovoltaic Effect Observed for Metal-Coated Semiconductor Electrodes and its Utilization for the Photolysis of Water", pp. 1002-1007.

*Primary Examiner*—Arthur P. Demers
*Attorney, Agent, or Firm*—Oblon, Fisher, Spivak, McClelland & Maier

[57] ABSTRACT

On a silicon semiconductor or a silicon semiconductor having a coating of a noble metal, a polymer film is deposited by immersing the silicon semiconductor or the silicon semiconductor with the noble metal coating in a solution containing a thiophene compound, applying a voltage to the silicon semiconductor as an electrode and, at the same time, exposing the silicon semiconductor to light.

9 Claims, No Drawings

METHOD FOR PRODUCTION OF FILM-COATED SILICON SEMICONDUCTOR ELECTRODE

FIELD OF THE INVENTION AND RELATED ART STATEMENT

In the broadest sense this invention falls within the technological field of energy utilization. More particularly, it relates to a method for the production of a coated silicon semiconductor electrode for use in photoelectrochemical cell which converts light energy into electric or chemical energy.

The photoelectrochemical cell using a semiconductor electrode has been drawing attention as a device for converting the energy of light into electric energy or as a device for converting the energy of light into a chemical energy as in the production of hydrogen by the photodecomposition of water. Since it requires the semiconductor electrode to be immersed in the solution of an electrolyte, it has the disadvantage that the semiconductor is dissolved or oxidized in the electrolyte solution, shortening its service life and rapidly degrading its performance. Particularly when the silicon semiconductor is used as an working electrode and exposed to light for conversion of the energy of light into electric energy, a coating of $SiO_2$ is formed on the surface of the electrode in a matter of a few seconds and the performance of the electrode is abruptly degraded. For the solution of these problems, a method in which the surface of the semiconductor electrode is coated with a thin layer of such a noble metal as gold [Y. Nakato, K. Abe, and H. Tsubomura: Ber. Bunsenges. Phys. Chem., 80, 1002 (1976)] and a method which comprises the coating with a thin layer of an electroconductive polymer such as polypyrrole [R. Noufi, De. Tench., and L. F. Warren: J. Electrochem. Soc., 128, 2596 (1981)] have been tried. By these methods, however, it is difficult to form a film in a uniform thickness and the coated electrode, after protracted use, suffers from separation of the coating. At the present time, no method able to provide a satisfactory solution to these problems has been provided.

The desirability of developing an electrode free from the drawbacks mentioned above has been recognized.

OBJECT AND SUMMARY OF THE INVENTION

This invention has been achieved with a view to overcoming the drawbacks of the silicon semiconductor electrode of prior art mentioned above. An object of this invention is to enable production of a coated silicon semiconductor electrode which has a coating of uniform thickness and retains its properties stably during protracted use.

The object of this invention is accomplished by a method for the production of a polymer-coated silicon semiconductor electrode, which comprises immersing a silicon semiconductor in an electrolytic bath containing a thiophene compound and a supporting electrolyte, applying a positive voltage to the silicon semiconductor as an electrode and, at the same time, exposing the semiconductor to light thereby inducing polymerization of the thiophene compound and depositing a coating of the resulting polymer on the surface of the silicon semiconductor. The object is further accomplished by a method for the production of a polymer-coated silicon semiconductor electrode, which comprises forming a coating of a noble metal on the surface of a silicon semiconductor, immersing the noble metal-coated silicon semiconductor in an electrolytic bath containing a thiophene compound and a supporting electrolyte, applying a positive voltage to the noble metal-coated silicon semiconductor as an electrode and, at the same time, exposing the noble metal-coated silicon semiconductor to light thereby inducing polymerization of the thiophene compound and depositing a coating of the resulting polymer on the surface of the noble metal-coated silicon semiconductor.

DETAILED DESCRIPTION OF THE PREFERRED EMBODIMENT

The silicon semiconductor to be used in the method of this invention is produced by doping a single-crystal, polycrystalline, or amorphous silicon with phosphorus or antimony thereby making the silicon semiconductive.

As examples of thiophene compounds usable in this invention, there may be cited thiophene, 3-methylthiophene, 3-ethylthiophene, 3-propylthiophene, 3,4-dimethylthiophene, and 3,4-diethylthiophene. Other examples are 3-phenylthiophene, 2,2'-bithiophene, and 2,2'-dithienylethylene.

As examples of supporting electrolytes, there may be cited tetrabutyl ammonium tetrafluoroborate and tetrabutyl ammonium hexafluorophosphate besides tetrabutyl ammonium trifluoromethanesulfonate.

Now, the method of this invention as worked by using a silicon semiconductor will be described specifically below.

First, a solution is prepared by dissolving a thiophene compound in a solvent such as purified acetonitrile and further adding a supporting electrolyte to the resulting solution. In the solution, a silicon semiconductor electrode having the surface thereof etched with hydrofluoric acid and a counter electrode of platinum, for example, are placed. The surface of the silicon semiconductor is exposed to the light from such a light source as a halogen lamp and, at the same time, a positive voltage is applied to the silicon semiconductor to induce electrochemical polymerization on the surface of the silicon semiconductor.

The light source to be used in this case may be a halogen lamp, a tungsten lamp, a xenon lamp, or a mercury lamp. Otherwise, sunlight may be utilized as the light source.

In the case of a silicon semiconductor having a noble metal coating, the procedure described above with respect to a plain silicon semiconductor can be followed, except that the coating of the noble metal is formed on the silicon semiconductor after the surface thereof has been etched with hydrofluoric acid.

The solvent may be nitrobenzene or nitromethane instead of acetonitrile.

The coating of a thiophene compound polymer deposited on the surface of the silicon semiconductor or on the noble metal-coated silicon semiconductor in consequence of the electrochemical polymerization induced by the exposure of the conductor to the light contains the component ions of the compound used as a supporting electrolyte and, therefore, possesses high electroconductivity.

In the method of the present invention, the concentration of the thiophene compound in the electrolytic bath is in the range of 10 g/liter to 500 g/liter and the amount of the supporting electrolyte is in the range of 1/5 to 1/50 of the amount of the thiophene compound.

If the concentration of the thiophene compound exceeds the upper limit of the range mentioned above, the produced coating of the thiophene compound polymer lacks uniformity in thickness. If it falls short of the lower limit, the rate of the formation of the coating is too slow. If the amount of the supporting electrolyte exceeds the upper limit of the range mentioned above, the coating cannot easily be formed in a uniform thickness. If the amount falls short of the lower limit, the concentration of the dopant in the thiophene compound polymer is low, the electric resistance of the produced coating is large, and the photoelectric current is insufficient.

Generally the practice of immersing a semiconductor in an electrolytic bath and allowing a coating of uniform thickness to be deposited on the surface of the semiconductor by means of electrochemical polymerization is difficult to accomplish because the semiconductor is liable to dissolution and oxidation while standing in the electrolytic bath. The coating of a uniform thickness is easily obtained, however, by the method of the present invention. Generally the silicon semiconductor is highly susceptible to oxidation. It has been known to the art that when a silicon semiconductor is used as a working electrode in an electrolyte for a photoelectrochemical cell and exposed to a light, the photoelectric current flowing in the electrolyte is seriously attenuated in a matter of several seconds. The uniform coating formed on the surface of the silicon semiconductor by the method of this invention exhibits a protective effect for a long time and permits the electrode to retain its performance intact during protracted service. (See Referential Experiment)

When the silicon semiconductor has the preliminary coating of a noble metal, the polymer coated electrode manifests outstanding stability.

This invention does not discriminate among noble metal-coated silicon semiconductors by the method adopted for the formation of the coating. Examples of noble metals usable in this invention are platinum, gold, and silver. For example, the coating may be obtained by placing a silicon semiconductor in a vacuum and heating a given noble metal in the vacuum thereby allowing the vaporized noble metal to deposit on the surface of the silicon semiconductor or by placing the silicon semiconductor as an electrode in an aqueous solution of a salt of given noble metal and enabling to form a coating of the noble metal electrochemically on the surface of the silicon semiconductor.

When the coated silicon semiconductor obtained by the present invention is used as a working electrode for a photoelectrochemical cell, since it is coated with the thiophene compound polymer capable of stably retaining a satisfactory performance and excelling in adhesiveness even in the aqueous solution of electrolyte, the coating is not separated from the substrate and the semiconductor itself endures protracted use. When this coated silicon semiconductor is used in the assembly of a photoelectrochemical cell, the produced cell can be utilized for the conversion of solar energy into electric or chemical energy.

Now, the present invention will be described more specifically below with reference to working examples and referential experiments.

EXAMPLE 1

In 29 ml of purified acetonitrile, 2.5 g of purified 3-methylthiophene and 0.5 g of tetrabutyl ammonium trifluoromethanesulfonate were dissolved. The resulting solution was placed in a container made of Pyrex glass. In the solution, an electrode of platinum and an n-type single-crystal silicon semiconductor electrode were immersed and argon gas was blown for 6 minutes. The surface of the silicon semiconductor electrode was exposed to light of an intensity of 33.2 $mW/cm^2$ from a halogen lamp disposed outside the glass container and, at the same time, a voltage of 3.2 volts was applied to the silicon semiconductor electrode, to effect electrochemical polymerization for a period of 4 minutes. Consequently, a thin coating of 3-methylthiophene polymer containing trifluoromethanesulfonate ions was formed on the surface of the silicon semiconductor. The density of the electric current during the photochemical polymerization was in the range of 2.4 to 0.83 mA per $cm^2$ of the surface of the silicon semiconductor.

EXAMPLE 2

A solution of 2.5 g of purified 3-methylthiophene and 0.42 g of tetrabutyl ammonium tetrafluoroborate in 29 ml of purified acetonitrile was placed in a container of Pyrex glass. In the solution, an electrode of platinum and an n-type single-crystal silicon semiconductor etched in advance with hydrofluoric acid were immersed and argon gas was blown for 6 minutes. The silicon semiconductor electrode was exposed to the light of an intensity of 112 $mW/cm^2$ and a voltage of 3.8 volts was applied to the silicon semiconductor by following the procedure of Example 1, to effect photoelectrochemical polymerization for a period of 1 minute. Consequently, a thin coating of 3-methylthiophene polymer containing tetrafluoroborate ions was formed on the surface of the silicon semiconductor. During the photoelectrochemical polymerization, the density of the electric current was in the range of 5.2 to 3.3 mA per $cm^2$ of the surface of the silicon semiconductor.

REFERENTIAL EXPERIMENT 1

A glass container provided with a window for passage of light was charged with an aqueous solution (pH 1.0) containing sodium sulfate, ferrous sulfate, and ammonium ferric sulfate each in an amount of 0.1 mol/liter, and sulfuric acid in an amount of 0.12 mol/liter. In the solution, the coated silicon semiconductor electrode obtained in Example 1, a silver-silver chloride reference electrode, and a counter electrode of platinum were immersed. Light of an intensity of 33.2 $mW/cm^2$ from a halogen lamp was projected on the coated electrode and the electrode was tested for photoelectric current. At the end of one hour's exposure to the light, the attenuation of the photoelectric current was 8.6%. In the case of a silicon electrode which was not coated, the attenuation of the photoelectric current was substantially 100% after one minute's exposure.

EXAMPLE 3

An n-type single-crystal silicon semiconductor (doped with phosphorus) etched in advance with hydrofluoric acid was placed in a vacuum deposition device. Under a vacuum of the order of $10^{-4}$ to $10^{-5}$ mmHg, gold placed at a distance of 4.3 cm was heated red hot to effect deposition of the vaporized gold on the surface of the silicon semiconductor for 22 seconds.

Separately, a solution of 2.5 g of purified 3-methylthiophene and 0.5 g of tetrabutyl ammonium trifluoromethanesulfonate in 29 ml of purified acetonitrile was placed in a container of Pyrex glass. In the solution, an electrode of platinum and the n-type single-crystal silicon semiconductor electrode coated with the vacuum deposited gold as described above were immersed and argon gas was blown for 6 minutes. The surface of the semiconductor electrode was exposed to light of an intensity of 33.2 mW/cm$^2$ from a halogen lamp disposed outside the container and, at the same time, a voltage of 3.2 volts was applied to the gold-coated silicon semiconductor electrode to effect electrochemical polymerization for a period of 70 seconds. Consequently, a thin coating of 3-methylthiophene polymer containing trifluoromethanesulfonate ions was formed on the surface of the silicon semiconductor electrode. During the electrochemical polymerization, the density of the electric current was in the range of 13.1 to 2.85 mA per cm$^2$ of the surface of the silicon semiconductor.

EXAMPLE 4

A solution of 2.5 g of purified 3-methylthiophene and 0.42 g of tetrabutyl ammonium tetrafluoroborate in 29 ml of purified acetonitrile was placed in a container of Pyrex glass. In the solution, an electrode of platinum and an n-type single-crystal silicon semiconductor electrode having gold film vacuum deposited thereon were immersed and argon gas was blown for a period of 6 minutes. The silicon semiconductor electrode was exposed to light of an intensity of 112 mW/cm$^2$ and a voltage of 3.3 volts was applied to the electrode by following the procedure of Example 3, to effect electrochemical polymerization for 57 seconds. Consequently, a thin coating of 3-methylthiophene polymer containing tetrafluoroborate ions was formed on the surface of the gold-coated silicon semiconductor. During the electrochemical polymerization, the density of the electric current was in the range of 10.1 to 5.1 mA per cm$^2$ of the surface of the silicon semiconductor.

REFERENTIAL EXPERIMENT 2

In a glass container provided with a window for passage of light, an aqueous solution (pH 1.0) containing sodium sulfate, ferrous sulfate, and ammonium ferric sulfate each in an amount of 0.1 mol/liter and sulfuric acid in an amount of 0.12 mol/liter was placed. In the solution, the coated silicon semiconductor electrode formed in Example 3, a silver-silver chloride reference electrode, and an electrode of platinum were immersed and exposed to light of an intensity of 33.2 mW/cm$^2$ from a halogen lamp and tested for photoelectric current. At the end of one hour's exposure, the attenuation of the photoelectric current was 3.0%. In the case of a silicon electrode which was not coated, the attenuation of the photoelectric current was substantially 100% after one minute's exposure. In the case of a silicon electrode which was coated exclusively with gold, the attenuation of the photoelectric current was 96.2% after one hour's exposure.

REFERENTIAL EXPERIMENT 3

The coated silicon semiconductor electrode obtained in Example 4, a silver-silver chloride reference electrode, and a counter electrode of platinum were immersed in the same aqueous solution as used in Referential Experiment 2 and exposed to the light of an intensity of 33.3 mW/cm$^2$ from a halogen lamp and tested for photoelectric current. After one hour's exposure, absolutely no attenuation of the photoelectric current was observed.

EXAMPLE 5

On the same n-type single-crystal silicon semiconductor as used in Example 3, gold was vacuum deposited for 7 seconds by using the same vacuum deposition device as used in Example 3. The gold-coated silicon semiconductor electrode so produced and an electrode of platinum were immersed in the same solution containing 3-methylthiophene, etc. as used in Example 3 and subjected to the same electrochemical polymerization for 10.8 seconds. During the polymerization, the density of the electric current and the amount of electricity were 13.5 to 3.7 mA and 48 mC respectively.

REFERENTIAL EXPERIMENT 4

The coated silicon semiconductor electrode obtained in Example 5 and an electrode of platinum were immersed in the same solution as used in Referential Experiment 1, exposed to light of an intensity of 33.3 mW/cm$^2$ from a halogen lamp, and tested for photoelectric current and photoelectric voltage. The short-circuit photoelectric current was about 8 mA/cm$^2$ and the open-circuit photoelectric voltage was 0.3 volt.

What is claimed is:
1. A method for the production of a polymer-coated silicon semiconductor electrode, which comprises:
   immersing a silicon semiconductor having the surface thereof etched with hydrofluoric acid, with a counter electrode in an electrolytic bath containing a thiophene compound which is at least one member selected from the group consisting of thiophene, 3-methylthiophene, 3-ethylthiophene, 3-propylthiophene, 3,4-dimethylthiophene, 3,4-diethylthiophene, 3-phenylthiophene, 2,2'-bithiophene, and 2,2'-dithienylethylene, and a supporting electrolyte which is at least one member selected from the group consisting of tetrabutyl ammonium trifluoromethanesulfonate, tetrabutyl ammonium tetrafluoroborate, and tetrabutyl ammonium hexafluorophosphate,
   applying a positive voltage on said silicon semiconductor as an electrode and, at the same time,
   exposing said silicon semiconductor to light, thereby inducing polymerization of said thiophene compound and forming a coating of the resulting polymer on the surface of said silicon semiconductor, wherein the concentration of said thiophene compound in said electrolytic bath is in the range of 10 g/liter to 500 g/liter and the amount of said supporting electrolyte is in the range of ⅓ to 1/50 of the amount of said thiophene compound.

2. The method of claim 1, wherein said silicon semiconductor is produced by doping a single-crystal, polycrystalline, or amorphous silicon with phosphorus or antimony.

3. The method of claim 1, wherein said light is produced by a light source selected from the group consisting of a halogen lamp, a tungsten lamp, a xenon lamp, and a mercury lamp.

4. The method of claim 1, wherein said light has an intensity ranging from about 33.2 mW/cm$^2$ to 112 mW/cm$^2$.

5. A method for the production of a polymer-coated silicon semiconductor electrode, which comprises:
   forming a coating of a noble metal on the surface of a silicon semiconductor having the surface thereof etched with hydrofluoric acid, immersing the resulting noble metal-coated silicon semiconductor with a counter electrode in an electrolytic bath containing a thiophene compound which is at least one member selected from the group consisting of thiophene, 3-methylthiophene, 3-ethylthiophene, 3-propylthiophene, 3,4-dimethylthiophene, 3,4-diethylthiophene, 3-phenylthiophene, 2,2'-bithiophene, and 2,2'-dithienylethylene, and a supporting electrolyte which is at least one member selected from the group consisting of tetrabutyl ammonium trifluoromethanesulfonate, tetrabutyl ammonium tetrafluoroborate, and tetrabutyl ammonium hexafluorophosphate, applying a positive voltage to said noble metal-coated silicon semiconductor and, at the same time, exposing said coated silicon semiconductor to light, thereby inducing polymerization of said thiophene compound and forming a coating of the resulting polymer on the surface of said noble metal-coated silicon semiconductor, wherein the concentration of said thiophene compound in said electrolytic bath is in the range of 10 g/liter to 500 g/liter and the amount of said supporting electrolyte is in the range of ⅓ to 1/50 of the amount of said thiophene compound.

6. The method of claim 5, wherein said silicon semiconductor is produced by doping a single-crystal, polycrystalline, or amorphous silicon with phosphorus or antimony.

7. The method of claim 5, wherein said light is produced by a light source selected from the group consisting of a halogen lamp, a tungsten lamp, a xenon lamp, and a mercury lamp.

8. The method of claim 5, wherein said noble metal is selected from the group consisting of platinum, gold and silver.

9. The method of claim 5, wherein said light has an intensity ranging from 33.2 mW/cm$^2$ to 112 mW/cm$^2$.

* * * * *